United States Patent
Little

(10) Patent No.: US 10,160,361 B2
(45) Date of Patent: Dec. 25, 2018

(54) FOUR-WAY ELECTRIC POWER ACTUATION HEAD RESTRAINT

(71) Applicant: WINDSOR MACHINE AND STAMPING (2009) LTD., Windsor (CA)

(72) Inventor: Mark Leonard Little, Maidstone (CA)

(73) Assignee: WINDSOR MACHINE AND STAMPING (2009) LTD., Windsor (CA)

( * ) Notice: Subject to any disclaimer, the term of this patent is extended or adjusted under 35 U.S.C. 154(b) by 0 days.

(21) Appl. No.: 15/657,816

(22) Filed: Jul. 24, 2017

(65) Prior Publication Data

US 2018/0029510 A1 Feb. 1, 2018

Related U.S. Application Data

(60) Provisional application No. 62/367,257, filed on Jul. 27, 2016.

(51) Int. Cl.
| | |
|---|---|
| *B60N 2/80* | (2018.01) |
| *B60N 2/806* | (2018.01) |
| *B60N 2/829* | (2018.01) |
| *B60N 2/865* | (2018.01) |
| *B60N 2/02* | (2006.01) |

(52) U.S. Cl.
CPC ........... *B60N 2/829* (2018.02); *B60N 2/0232* (2013.01); *B60N 2/865* (2018.02); *B60N 2002/024* (2013.01)

(58) Field of Classification Search
CPC ...... B60N 2/0232; B60N 2/829; B60N 2/865; B60N 2002/024

USPC .................................................. 297/409, 410
See application file for complete search history.

(56) References Cited

U.S. PATENT DOCUMENTS

| | | | | | |
|---|---|---|---|---|---|
| 5,131,720 A | * | 7/1992 | Nemoto | ................. | B60N 2/829 297/410 |
| 5,288,129 A | * | 2/1994 | Nemoto | ................. | B60N 2/829 297/410 |
| 5,694,320 A | * | 12/1997 | Breed | .................... | B60N 2/002 297/216.12 X |
| 5,748,473 A | * | 5/1998 | Breed | .................... | B60N 2/002 297/410 X |
| 5,822,707 A | * | 10/1998 | Breed | .................... | B60R 25/25 701/49 |

(Continued)

FOREIGN PATENT DOCUMENTS

| | | |
|---|---|---|
| CN | 102795134 A1 | 11/2012 |
| DE | 102012025191 B3 | 1/2014 |

(Continued)

OTHER PUBLICATIONS

Search Report regarding related EP App. No. 17183281.9; dated Dec. 15, 2017; 6 pgs.

*Primary Examiner* — Rodney B White
(74) *Attorney, Agent, or Firm* — Cantor Colburn LLP

(57) ABSTRACT

A head restraint assembly includes a base portion mountable to a vehicle seat. Also included is a frame plate disposed within a cover. Further included is a vertical power actuation mechanism operatively coupled to the frame plate for vertical adjustment of the frame plate. Yet further included is a fore-aft power actuation mechanism operatively coupled to the frame plate for fore-aft adjustment of the frame plate.

14 Claims, 7 Drawing Sheets

(56) References Cited

U.S. PATENT DOCUMENTS

| | | | | |
|---|---|---|---|---|
| 5,848,661 A * | 12/1998 | Fu | ................ | B60N 2/002 |
| | | | | 297/410 X |
| 6,078,854 A * | 6/2000 | Breed | ................ | B60N 2/002 |
| | | | | 701/49 |
| 6,242,701 B1 * | 6/2001 | Breed | ................ | B60N 2/002 |
| | | | | 177/144 |
| 6,899,395 B2 * | 5/2005 | Yetukuri | ................ | B60N 2/85 |
| | | | | 297/410 X |
| 7,232,187 B1 * | 6/2007 | Sundararajan | ....... | B60N 2/0232 |
| | | | | 297/410 |
| 7,762,582 B2 * | 7/2010 | Breed | ................ | B60N 2/002 |
| | | | | 180/274 |
| 8,038,219 B2 * | 10/2011 | Boes | ................ | B60N 2/888 |
| | | | | 297/410 |
| 8,042,415 B2 * | 10/2011 | Ito | ................ | B60N 2/0232 |
| 8,899,685 B2 * | 12/2014 | Haeske | ................ | B60N 2/809 |
| | | | | 297/410 |
| 8,950,815 B2 * | 2/2015 | Wang | ................ | B60N 2/4814 |
| | | | | 297/410 |
| 9,878,645 B2 * | 1/2018 | Kim | ................ | B60N 2/865 |
| 2001/0028191 A1 * | 10/2001 | Lance | ................ | A47C 7/38 |
| | | | | 297/410 |
| 2010/0231023 A1 * | 9/2010 | Wuerstlein | ............. | B60N 2/002 |
| | | | | 297/410 |
| 2012/0013155 A1 * | 1/2012 | Hwang | ................ | B60N 2/002 |
| | | | | 297/216.12 |
| 2013/0229042 A1 | 9/2013 | Kotz | | |
| 2016/0129816 A1 * | 5/2016 | Lee | ................ | B60N 2/4864 |
| | | | | 297/409 |
| 2016/0250953 A1 | 9/2016 | Yoo | | |
| 2017/0136925 A1 * | 5/2017 | An | ................ | A47C 7/38 |
| 2017/0253153 A1 * | 9/2017 | Kapusky | ................ | B60N 2/853 |
| 2017/0341546 A1 * | 11/2017 | Tatewaki | ............. | B60N 2/4864 |
| 2017/0341547 A1 * | 11/2017 | Tatewaki | ............. | B60N 2/4864 |

FOREIGN PATENT DOCUMENTS

| | | |
|---|---|---|
| EP | 2631116 A2 | 8/2013 |
| EP | 2698277 A1 | 2/2014 |
| WO | 2013154269 A1 | 10/2013 |

\* cited by examiner

FOUR-WAY ELECTRIC POWER ACTUATION HEAD RESTRAINT

CROSS-REFERENCE TO RELATED APPLICATION

This patent application claims priority to U.S. Provisional Application No. 62/367,257, filed Jul. 27, 2016, which is incorporated herein by reference in its entirety.

FIELD OF THE INVENTION

The subject matter disclosed herein relates to vehicle head restraints and, more particularly, to a vehicle head restraint that is translatable in multiple directions.

BACKGROUND OF THE INVENTION

Many vehicles, such as automobiles, include a headrest or head restraint atop an occupant's seat and in a position adjacent the occupant's head. Head restraints are typically cushioned for comfort, are height adjustable, and most are commonly finished in the same material as the rest of the seat. Design and assembly of head restraints require consideration of assembly structural integrity. Several challenges are involved with ensuring the desired structural integrity.

Movement of head restraints to reposition them to a desired location typically requires manual manipulation of the head restraints. A less cumbersome adjustment capability is desirable.

BRIEF DESCRIPTION OF THE INVENTION

According to one aspect of the invention, a head restraint assembly includes a base portion mountable to a vehicle seat. Also included is a frame plate disposed within a cover. Further included is a vertical power actuation mechanism operatively coupled to the base portion, the vertical power actuation mechanism comprising a first nut moveable along a first lead screw to adjust a vertical position of the frame plate. Yet further included is a fore-aft power actuation mechanism operatively coupled to the vertical power actuation mechanism, the fore-aft power actuation mechanism comprising a second nut moveable along a second lead screw to adjust a fore-aft position of the frame plate.

According to another aspect of the invention, a head restraint assembly includes a base portion mountable to a vehicle seat. Also included is a frame plate disposed within a cover. Further included is a vertical power actuation mechanism operatively coupled to the frame plate for vertical adjustment of the frame plate. Yet further included is a fore-aft power actuation mechanism operatively coupled to the frame plate for fore-aft adjustment of the frame plate.

According to yet another aspect of the invention, a multi-direction power actuated head restraint assembly includes a base portion including a pair of post members mountable to a vehicle seat. Also included is an armature assembly disposed within a cover. Further included is a single, unitary brace structure coupled to the armature in a fixed manner and operatively coupled to the base portion at vertical guide portions of the unitary brace structure, each of the vertical guide portions surrounding one of the pair of post members in a sliding relationship. Yet further included is a first nut moveable along a first lead screw to vertically translate the unitary brace structure to adjust a vertical position of the armature assembly. Also included is a second nut moveable along a second lead screw to translate the unitary brace structure in a fore-aft direction to adjust a fore-aft position of the armature assembly.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
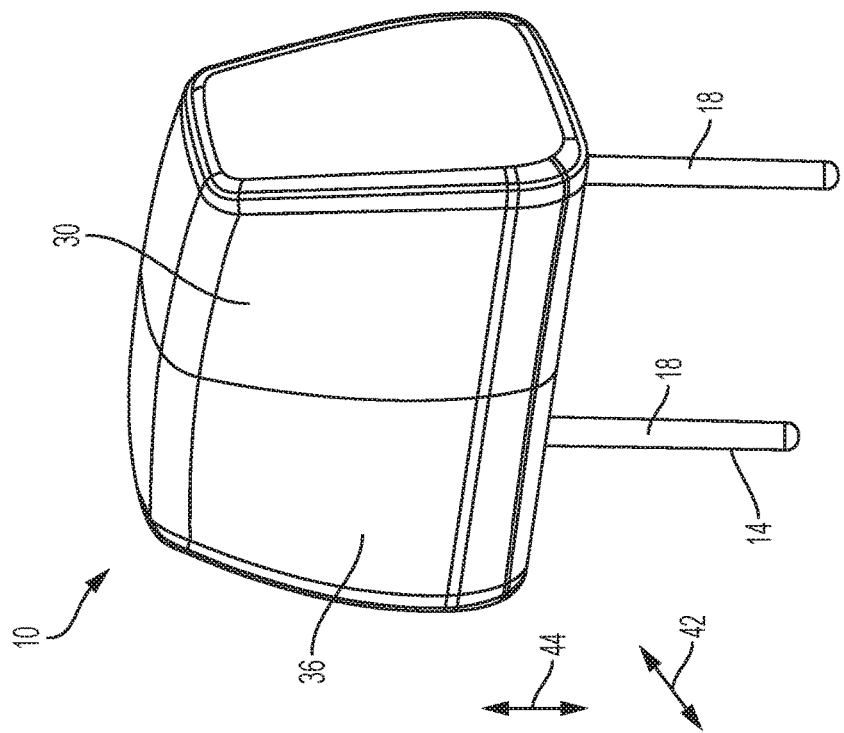
FIG. 1 is a front perspective view of a head restraint.

Referring FIG. 1, a head restraint assembly 10 is schematically depicted. The head restraint assembly 10 includes a base portion 14 that is mountable to a vehicle seat (not illustrated) and, more specifically, to the upper portion of the seatback of the vehicle seat. In the illustrated embodiment, the base portion 14 includes two post members 18 that are mounted, or mountable, to the top of the seatback of the vehicle seat, as understood by those skilled in the art. Each of the post members 18 extends into a respective hole formed in the top of the seatback to attach the head restraint assembly 10 to the vehicle seat.

The head restraint assembly 10 further includes a head restraint 30 mounted with respect to the base portion 14. The head restraint 30 includes a frame plate 34 (FIGS. 2 and 5-7) which is part of a frame assembly (or housing) that provides rigid structure to the head restraint 30 and partially encloses a number of components, as will be described in detail below. The head restraint 30 also includes a cushion and a head restraint cover 36 that are mounted with respect to the frame assembly for movement therewith. The head restraint cushion is comprised of a soft foam material or a like material to provide a cushion between the head of a human occupant of the vehicle seat and the frame plate 34. The head restraint cover covers at least part of the cushion and the housing to enhance the aesthetics of the head restraint. Exemplary cover materials include cloth, vinyl, leather, etc.

As will be appreciated from the description herein, the head restraint 30 is selectively translatable within a plane represented by directional indicator 42, i.e., a fore-aft direction, and a plane represented by directional indicator 44, i.e., an up-down direction, as desired by a user, with the translation driven by electric power.

Figure 2:
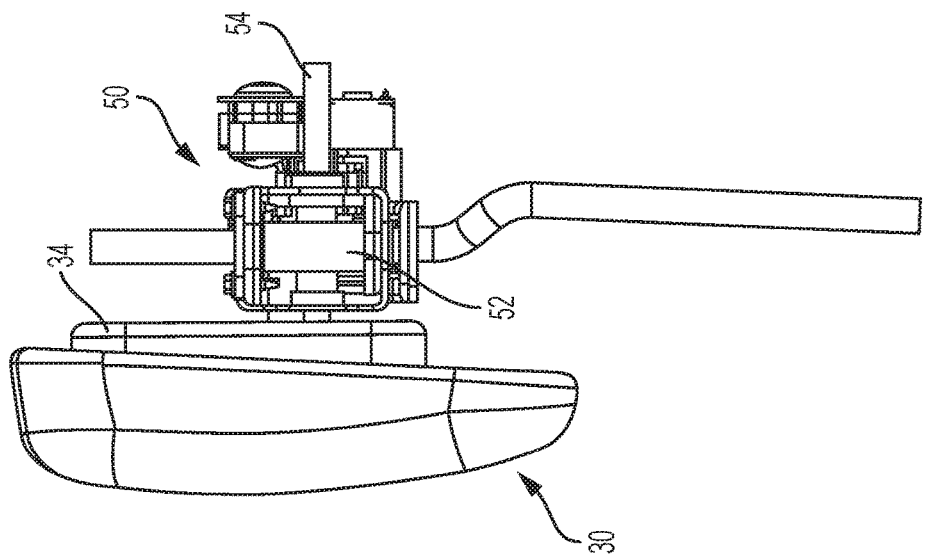
FIG. 2 is a side, elevation view of the head restraint with a portion of a cover removed.

Referring to FIG. 2, the head restraint 30 is illustrated with the cover 36 removed to show components housed therein. In particular, a power actuation assembly 50 is illustrated. The power actuation assembly 50 includes a vertical power actuation mechanism 52 and a fore-aft power actuation mechanism 54. The mechanisms 52, 54 independently translate the head restraint 30 in the respective directions in an electrically powered manner. In particular, the mechanisms 52, 54 are operatively coupled to the frame plate 34 to drive the head restraint 30 to a desired position, both vertically and fore-aft.

Figure 4:
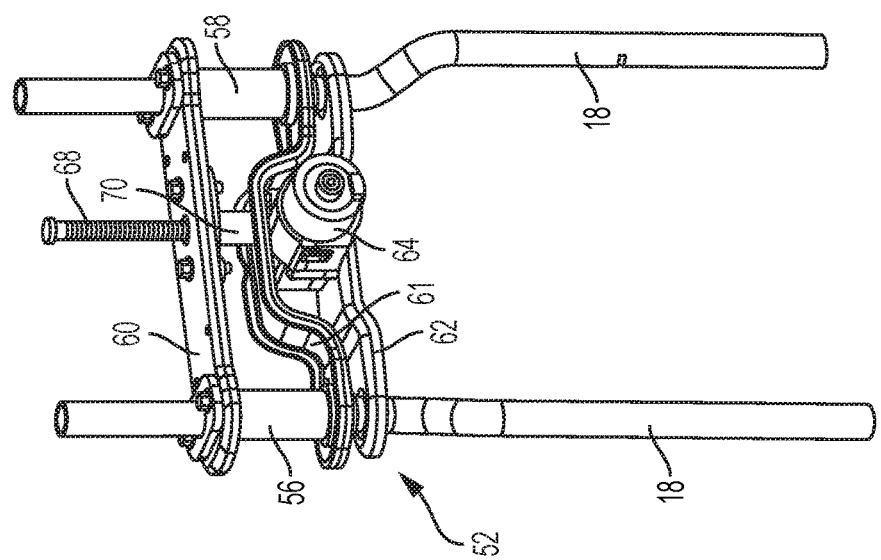
FIG. 4 is a rear perspective view of the vertical power actuation mechanism.
Figure 3:
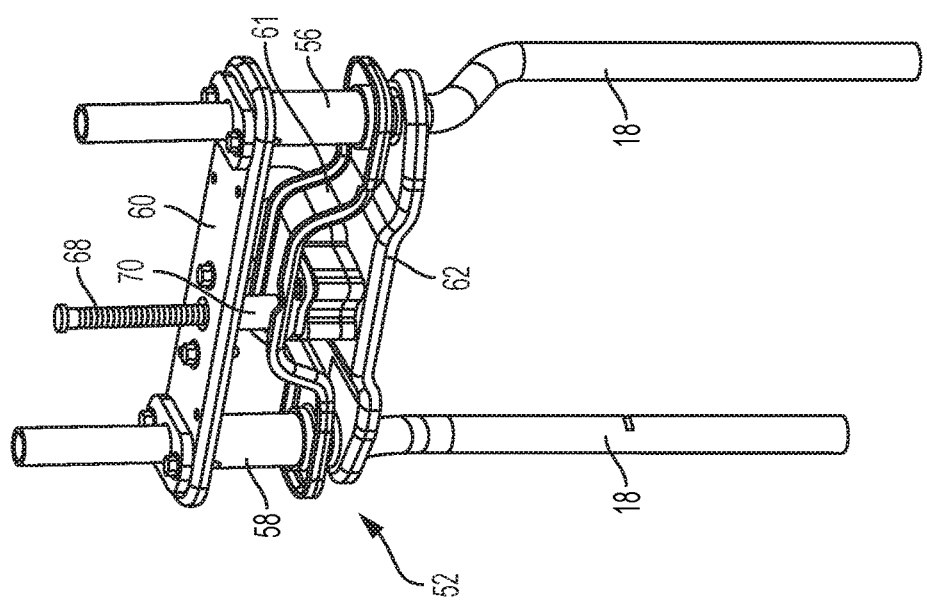
FIG. 3 is a front perspective view of a vertical power actuation mechanism.

Referring now to FIGS. 3 and 4, the vertical power actuation mechanism 52 is illustrated in greater detail. The vertical power actuation mechanism 52 includes a first vertical guide 56 and a second vertical guide 58. The vertical guides 56, 58 extend substantially parallel to each other and surround a portion of the upwardly extending posts 18 of the base portion 14. The guides 56, 58 slide vertically along the posts 18. In some embodiments, the vertical guides 56, 58 are formed of plastic, but alternative similar materials are contemplated. An upper cross brace 60, a middle cross brace 61 and a lower cross brace 62, each formed of a rigid material such as steel or the like, extend perpendicularly to the vertical guides 56, 58 and between the posts 18. The upper and middle cross braces 60, 61 each include apertures proximate their respective end regions to tightly surround the vertical guides 56, 58 and are secured to the guides 56, 58 in any suitable coupling technique. By fixing the upper and middle cross braces 60, 61 to the guides 56, 58, the upper and middle cross braces 60, 61 are in a sliding relationship relative to the vertical posts 18 due to the relative movement between the guides 56, 58 and the posts 18. The lower cross brace 62 includes a pair of apertures proximate its end regions to tightly surround the posts and is fixed thereto. Therefore, the lower cross brace 62 remains stationary relative to the posts 18.

A first electric actuator 64 is operatively coupled to the lower cross brace 62. The first electric actuator 64 has an output coupled to a first lead screw 68 that extends vertically therefrom. A first nut 70 is engaged with the first lead screw 68 and is coupled or engaged to the upper and middle cross braces 60, 61. In some embodiments, the first nut 70 is welded to the cross braces 60, 61. The first electric actuator 64 drives rotation of the first lead screw 68 to translate the first nut 70 therealong, thereby resulting in vertical translation of the upper and middle cross braces 60, 61.

Figure 6:
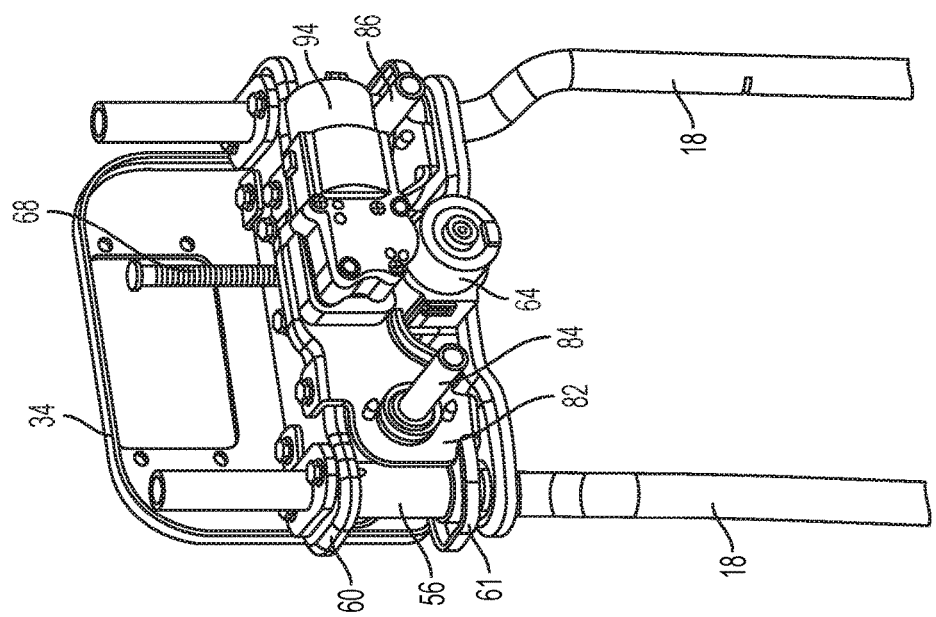
FIG. 6 is a rear perspective view of the frame plate in a second vertical position.
Figure 5:
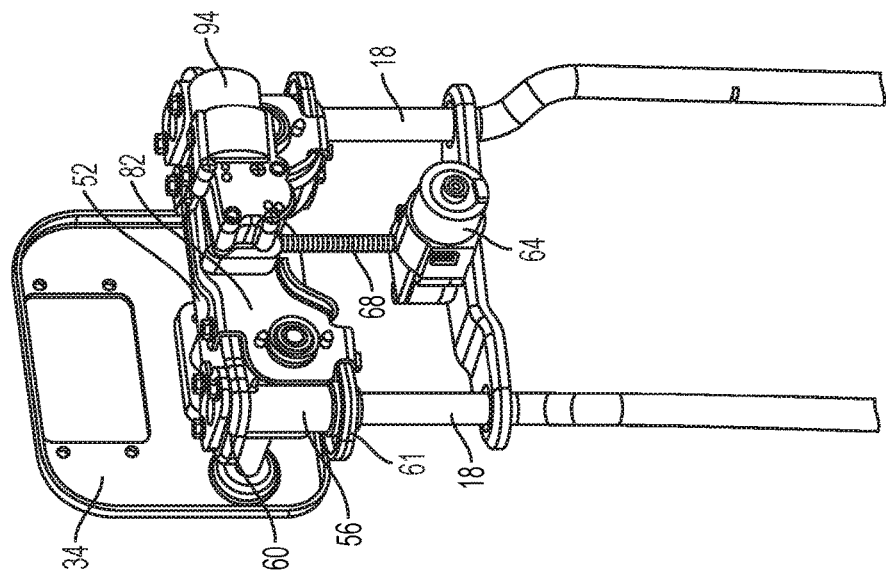
FIG. 5 is a rear perspective view of the frame plate of the head restraint in a first vertical position.

FIGS. 5 and 6 illustrate the vertical power actuation mechanism 52 in two different vertical positions. As shown, the vertical power actuation mechanism 52 is moveable between a downward position (FIG. 6) and an upward position (FIG. 5). Movement of the upper and middle cross braces 60, 61, the guides 56, 58 and the first nut 70 along the first lead screw 68 results in vertical movement of the frame plate 34 due to operative coupling thereto. Movement of the frame plate 34 drives vertical repositioning of the head restraint 30.

Figure 7:
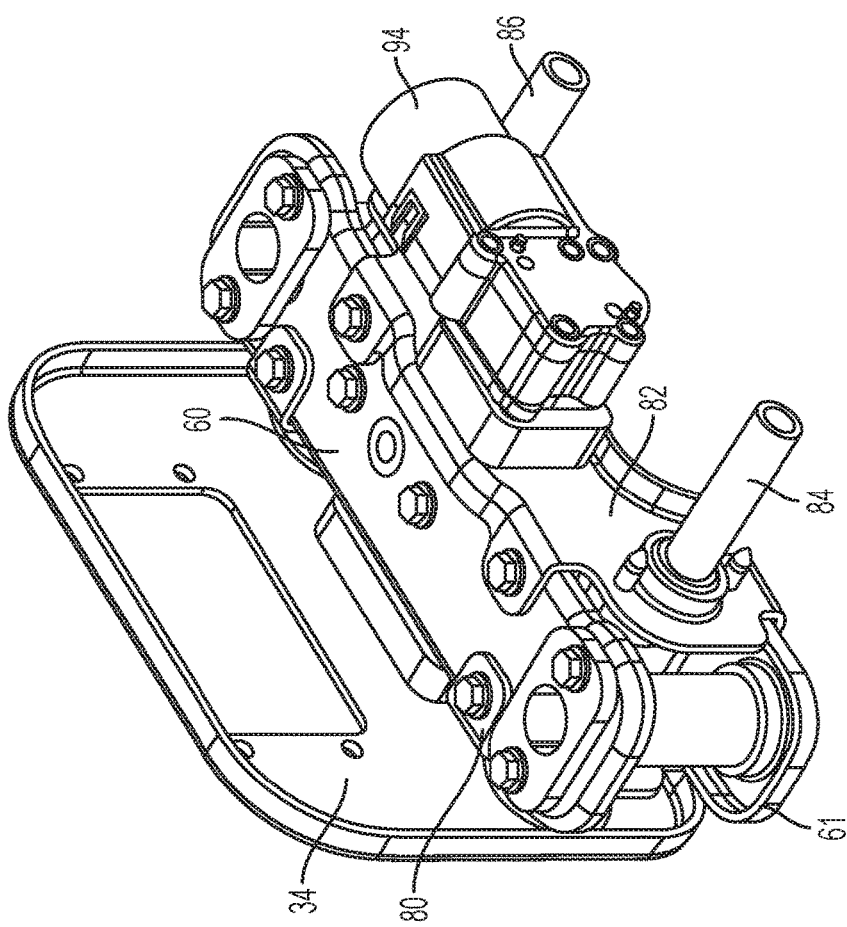
FIG. 7 is a rear perspective view of a fore-aft power actuation mechanism.
Figure 8:
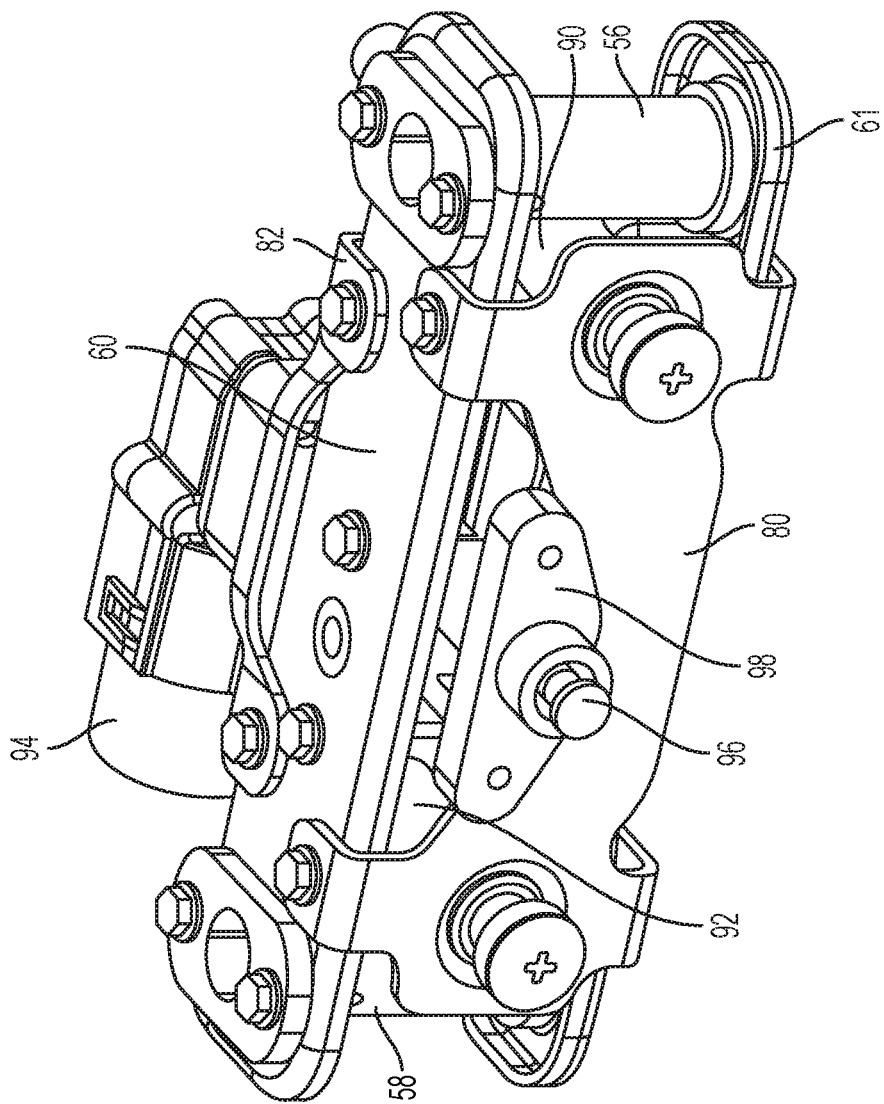
FIG. 8 is a front perspective view of the fore-aft power actuation mechanism.

Referring now to FIGS. 5-8, the fore-aft power actuation mechanism 54 is illustrated, with FIGS. 7 and 8 illustrating the mechanism 54 without the vertical power actuation mechanism for clarity. The fore-aft power actuation mechanism 54 includes a front cross brace 80 and a rear cross brace 82, each formed of a rigid material such as steel or the like and extending perpendicularly to the vertical guides 56, 58 and between the posts 18. The front and back cross braces 80, 82 each include apertures proximate their respective end regions to surround a first fore-aft post 84 and a second fore-aft post 86. Surrounding the fore-aft posts 84, 86 in sliding relationship is a first fore-aft guide 90 and a second fore-aft guide 92. The fore-aft guides 90, 92 extend substantially parallel to each other and slide in a fore-aft direction along the fore-aft posts 84, 86. In some embodiments, the fore-aft guides 90, 92 are formed of plastic, but alternative similar materials are contemplated.

The front and rear cross braces 80, 82 are secured to the fore-aft guides 90, 92 in any suitable coupling technique. By fixing the front and rear cross braces 80, 82 to the guides 90, 92, the front and rear cross braces 80, 82 are in a sliding relationship relative to the fore-aft posts 84, 86 due to the relative movement between the guides 90, 92 and the posts 84, 86.

The vertical power actuation mechanism 52 and the fore-aft power actuation mechanism 54 are coupled to each other in the manner shown. In particular, the front cross brace 80 is mechanically coupled to the upper and middle cross braces 60, 61. Similarly, the rear cross brace 82 is mechanically coupled to the upper and middle cross braces 60, 61.

A second electric actuator 94 is operatively coupled to the rear cross brace 82. The second electric actuator 94 has an output coupled to a second lead screw 96 that extends forwardly therefrom in a direction substantially parallel to posts 84, 86 and guides 90, 92. The second lead screw 96 extends through an opening of the frame plate 34 and includes a second nut 98 engaged to the second lead screw 96. The second nut 98 is mechanically fastened to a rear surface of the frame plate 34 with bolts, screws or the like. The frame plate 34 is also mechanically fastened to the fore-aft posts 84, 86 with bolts, screws or the like, as shown.

The second electric actuator 94 drives rotation of the second lead screw 96 to translate the second nut 98 therealong, thereby resulting in fore-aft translation of the frame plate 34 and fore-aft posts 84, 86 due to the mechanical coupling of the frame plate 34 to the posts 84, 86 and the second nut 98.

Figure 10:
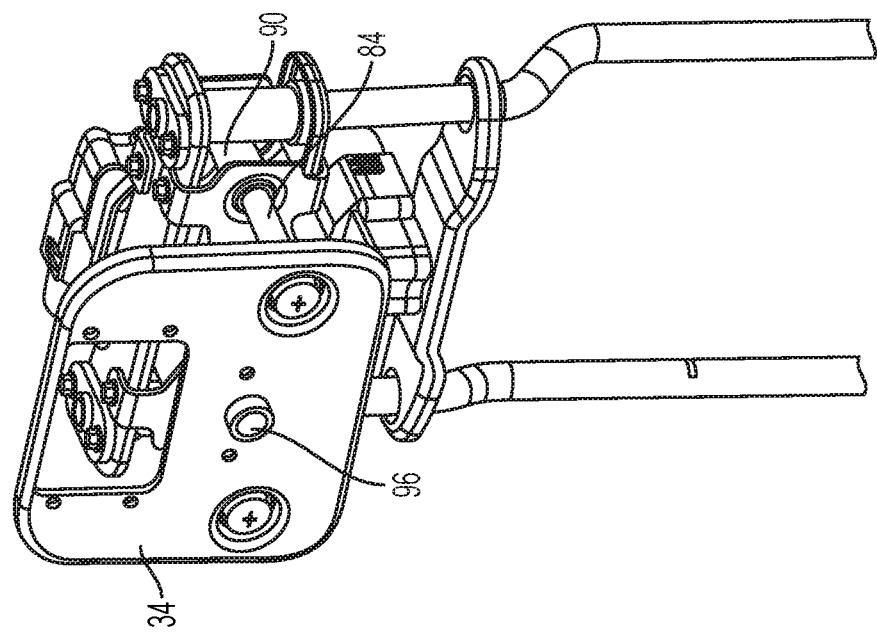
FIG. 10 is a front perspective view of the frame plate in a second fore-aft position.
Figure 9:
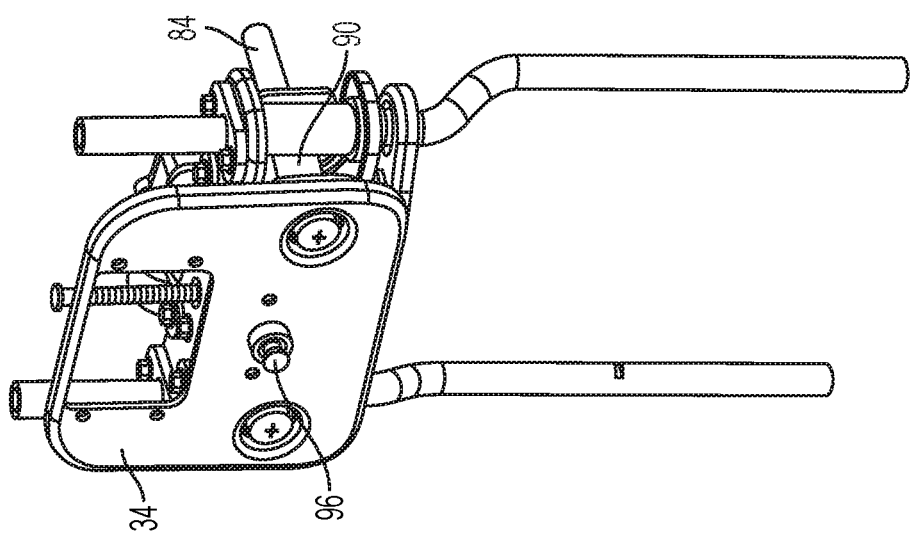
FIG. 9 is a front perspective view of the frame plate in a first fore-aft position.

FIGS. 9 and 10 illustrate the frame plate 34 in two different fore-aft positions due to actuation of the fore-aft power actuation mechanism 54. As shown, the fore-aft power actuation mechanism 54 is moveable between a rearward position (FIG. 9) and a forward position (FIG. 10). Movement of the second nut 98 along the second lead screw 96 results in fore-aft movement of the frame plate 34 due to operative coupling thereto. Movement of the frame plate 34 drives fore-aft repositioning of the head restraint 30.

Figure 11:
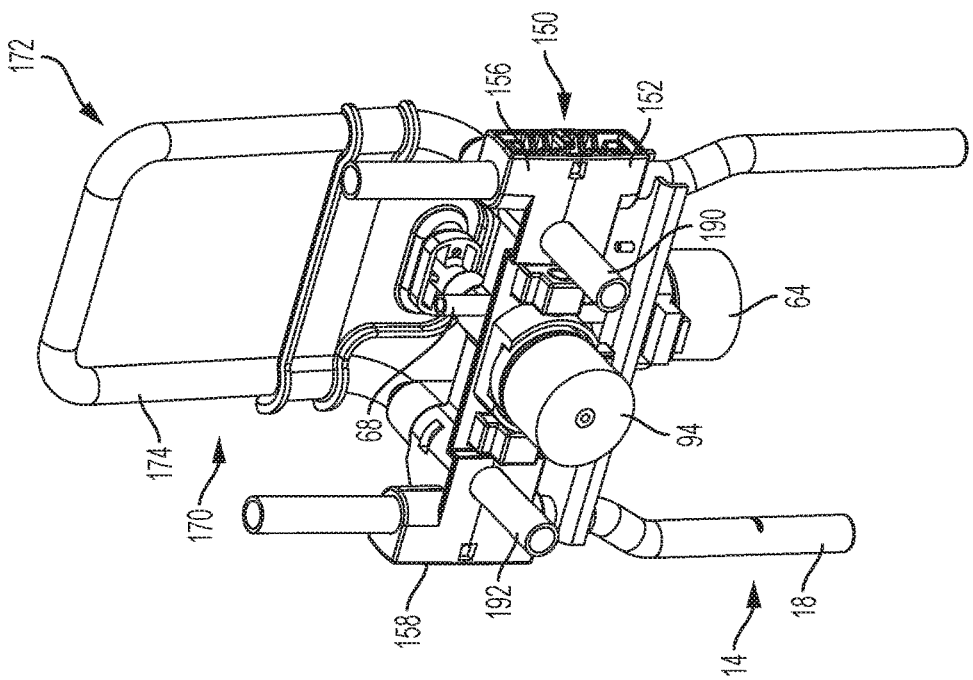
FIG. 11 is a front perspective view of a power actuation mechanism according to an aspect of the invention.
Figure 12:
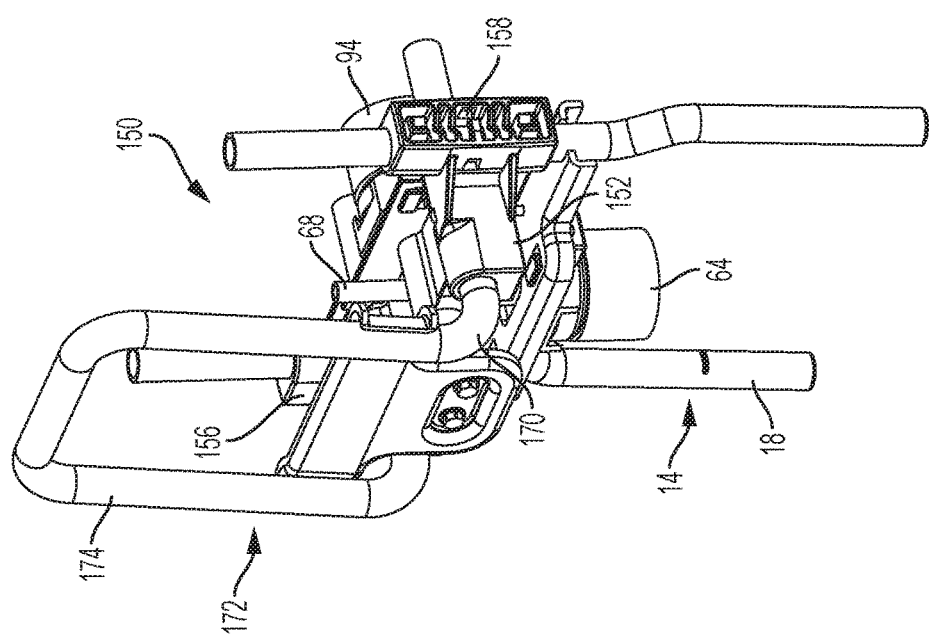
FIG. 12 is a rear perspective view of the power actuation mechanism of FIG. 11.

FIGS. 11 and 12 illustrate another embodiment of the power actuation assembly, which is referenced with numeral 150. The power actuation assembly 150 includes a unitary brace structure 152 that is translatable in a vertical direction. The unitary brace structure 152 includes vertical guide portions 156, 158 integrally formed with the unitary brace structure 152 and the vertical guide portions 158 slide directly on the upwardly extending posts 18 of the base portion 14. The guide portions 156, 158 slide vertically along the posts 18 during operation of the first electric actuator 64 which drives rotation of the first lead screw 68 to translate the first nut 70 therealong, thereby resulting in vertical translation of the unitary brace structure 152.

To facilitate fore-aft translation of the head restraint, the unitary brace structure 152 includes fore-aft guides 190, 192 that are coupled to a first segment 170 of an armature 172. The armature 172 also includes a second segment 174 with a front plate 176 coupled thereto. Operation of the second electric actuator 94 drives rotation of the second lead screw 96 to translate the second nut 98 therealong, thereby resulting in fore-aft translation of the armature 172 which is coupled to the fore-aft guides 190 192.

In some embodiments, the first and second electric actuators 64, 94 are stepper motors or the like with counters that precisely positions the head restraint to a pre-set position upon command from a user. For example, one or more pre-set head restraint positions may be available to a user in a vehicle based on the electrically powered actuation provided by the power actuation mechanisms 52, 54, 150. Additionally, due to the overall assembly of the mechanisms 52, 54,150, a 1-to-1 actuation relationship between the electric actuators 64, 94 and the translational output is achieved.

Advantageously, minimal effort is required to translate the head restraint 30 in two directions 42, 44 in an electrically powered manner.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multi-direction power actuated head restraint assembly comprising:
    a base portion mountable to a vehicle seat;
    a frame plate disposed within a cover;
    a vertical power actuation mechanism operatively coupled to the base portion, the vertical power actuation mechanism comprising a first nut moveable along a first lead screw to adjust a vertical position of the frame plate; and
    a fore-aft power actuation mechanism operatively coupled to the vertical power actuation mechanism, the fore-aft power actuation mechanism comprising a second nut moveable along a second lead screw to adjust a fore-aft position of the frame plate, the base portion including a pair of post members, the vertical power actuation mechanism operatively coupled to the base portion with a pair of vertical guides, each of the vertical guides surrounding one of the pair of post members in a sliding relationship, the vertical power actuation mechanism comprising a lower cross brace, a middle cross brace, and an upper cross brace, the lower cross brace operatively coupled to the pair of post members in a stationary manner, the middle cross brace and the upper cross brace operatively coupled to the pair of vertical guides, the fore-aft power actuation mechanism comprising a front cross brace and a rear cross brace.

2. The head restraint assembly of claim 1, wherein the middle cross brace and the upper cross brace are operatively coupled to the frame plate, wherein vertical movement of the middle and upper cross braces drives vertical movement of the frame plate.

3. The head restraint assembly of claim 1, wherein at least one of the front cross brace and the rear cross brace is operatively coupled to at least one of the upper cross brace and the middle cross brace.

4. The head restraint assembly of claim 3, wherein the front cross brace and the rear cross brace are fixedly coupled to a pair of fore-aft guides, the fore-aft guides surrounding a pair of fore-aft posts in a sliding relationship.

5. The head restraint assembly of claim 4, wherein at least one of the front cross brace and the rear cross brace is operatively coupled to the frame plate, wherein fore-aft movement of the front and rear cross braces drives fore-aft movement of the frame plate.

6. The head restraint assembly of claim 1, wherein the first nut is fixed to the upper cross brace and the middle cross brace.

7. The head restraint assembly of claim 6, wherein the first nut is welded to the upper cross brace and the middle cross brace.

8. The head restraint assembly of claim 1, wherein the vertical power actuation mechanism includes a first electric motor coupled to the lower cross brace.

9. The head restraint assembly of claim 8, wherein the first electric motor is a stepper motor.

10. The head restraint assembly of claim 1, wherein the fore-aft power actuation mechanism includes a second electric motor coupled to at least one of the front cross brace and the rear cross brace.

11. The head restraint assembly of claim 10, wherein the second electric motor is a stepper motor.

12. A multi-direction power actuated head restraint assembly comprising:
    a base portion mountable to a vehicle seat;
    a frame plate disposed within a cover;
    a vertical power actuation mechanism operatively coupled to the frame plate for vertical adjustment of the frame plate; and
    a fore-aft power actuation mechanism operatively coupled to the frame plate for fore-aft adjustment of the frame plate, the fore-aft power actuation mechanism comprising a nut moveable along a lead screw to adjust a fore-aft position of the frame plate, the lead screw oriented parallel to fore-aft movement of the frame plate.

13. A multi-direction power actuated head restraint assembly comprising:
    a base portion including a pair of post members mountable to a vehicle seat;
    an armature assembly disposed within a cover;
    a single, unitary brace structure coupled to the armature in a fixed manner and operatively coupled to the base portion at vertical guide portions of the unitary brace structure, each of the vertical guide portions surrounding one of the pair of post members in a sliding relationship;
    a first nut moveable along a first lead screw to vertically translate the unitary brace structure to adjust a vertical position of the armature assembly; and
    a second nut moveable along a second lead screw to translate the unitary brace structure in a fore-aft direction to adjust a fore-aft position of the armature assembly the fore-aft power actuation mechanism comprising a second nut moveable along a second lead screw to adjust a fore-aft position of the frame plate, the second lead screw oriented parallel to fore-aft movement of the frame plate.

14. The head restraint assembly of claim 13, further comprising a first electric motor for driving the first lead screw and a second electric motor for driving the second lead screw.

* * * * *